(12) United States Patent
Yang et al.

(10) Patent No.: US 9,000,681 B2
(45) Date of Patent: Apr. 7, 2015

(54) SYSTEMS AND METHODS FOR CURRENT MATCHING OF LED CHANNELS

(75) Inventors: Jiqing Yang, Shanghai (CN); Meng Li, Shanghai (CN); Liqiang Zhu, Shanghai (CN); Lieyi Fang, Shanghai (CN)

(73) Assignee: On-Bright Electronics (Shanghai) Co., Ltd., Shanghai (CN)

( * ) Notice: Subject to any disclaimer, the term of this patent is extended or adjusted under 35 U.S.C. 154(b) by 749 days.

(21) Appl. No.: 13/215,000

(22) Filed: Aug. 22, 2011

(65) Prior Publication Data
US 2013/0033105 A1 Feb. 7, 2013

(30) Foreign Application Priority Data
Aug. 4, 2011 (CN) .......................... 2011 1 0224941

(51) Int. Cl.
*H05B 37/02* (2006.01)
*G09G 3/32* (2006.01)

(52) U.S. Cl.
CPC ....................................... *G09G 3/32* (2013.01)

(58) Field of Classification Search
USPC .......... 315/185 R, 209 R, 224–226, 246, 250, 315/291, 297, 307, 312
See application file for complete search history.

(56) References Cited

U.S. PATENT DOCUMENTS

| 7,696,962 B2 * | 4/2010 | Hara et al. ....................... 345/77 |
| 7,999,492 B2 * | 8/2011 | Emek et al. ..................... 315/291 |
| 8,633,657 B2 * | 1/2014 | Shteynberg et al. .......... 315/291 |
| 2005/0218838 A1 * | 10/2005 | Lys ............................... 315/291 |
| 2006/0023002 A1 | 2/2006 | Hara et al. |
| 2007/0046485 A1 | 3/2007 | Grootes et al. |
| 2007/0182699 A1 * | 8/2007 | Ha et al. ........................ 345/102 |
| 2008/0068066 A1 | 3/2008 | Mittal |
| 2008/0284408 A1 | 11/2008 | Kunst et al. |
| 2009/0189539 A1 * | 7/2009 | Deng et al. .................... 315/294 |
| 2011/0115770 A1 * | 5/2011 | Seo et al. ....................... 345/211 |
| 2011/0127921 A1 * | 6/2011 | Lin et al. ....................... 315/192 |

(Continued)

FOREIGN PATENT DOCUMENTS

| CN | 101144936 | 3/2008 |
| CN | 101256761 | 9/2008 |
| TW | 200504641 | 2/2005 |
| TW | 201034516 | 9/2010 |

(Continued)

OTHER PUBLICATIONS

China Patent Office, Office Action mailed Jun. 26, 2014, in Application No. 201110224941.X.

*Primary Examiner* — Tung X Le
(74) *Attorney, Agent, or Firm* — Jones Day

(57) ABSTRACT

System and method are provided for generating a plurality of channel currents. The system includes a channel reference generator configured to receive a first reference current and generate at least a first channel driving current and a second channel driving current, a first channel current divider configured to receive the first channel driving current and generate a first input current, a second input current, and a third input current, a second channel current divider configured to receive the second channel driving current and generate a fourth input current, a fifth input current, and a sixth input current, a first channel driver configured to receive the first input current, the second input current, and the third input current and generate a first channel current, and a second channel driver configured to receive the fourth input current, the fifth input current, and the sixth input current and generate a second channel current.

25 Claims, 7 Drawing Sheets

(56) References Cited

U.S. PATENT DOCUMENTS

2011/0169425 A1* 7/2011 Sha et al. .................. 315/307
2012/0181942 A1* 7/2012 Redjebian ................. 315/210

FOREIGN PATENT DOCUMENTS

| TW | 201119511 | 6/2011 |
| TW | 1440396 B | 6/2014 |

* cited by examiner

US 9,000,681 B2

SYSTEMS AND METHODS FOR CURRENT MATCHING OF LED CHANNELS

1. CROSS-REFERENCES TO RELATED APPLICATIONS

This application claims priority to Chinese Patent Application No. 201110224941.X, filed Aug. 4, 2011, commonly assigned, incorporated by reference herein for all purposes.

2. BACKGROUND OF THE INVENTION

The present invention is directed to integrated circuits. More particularly, the invention provides systems and methods for current matching. Merely by way of example, the invention has been applied to current matching of LED channels. But it would be recognized that the invention has a much broader range of applicability.

Liquid crystal displays (LCDs) have been widely used in various electronics products. A LCD panel usually does not have a self-illuminating property. A backlighting source often needs to be used to illuminate the LCD panel from the back of the LCD panel. Each pixel of the LCD panel often filters the light from the backlighting source differently to produce images. Light emitting diodes (LEDs) have been used in backlighting for LCDs. When multiple channels of LEDs are implemented for backlighting, a reference current can be provided to generate channel currents for driving LEDs, and the error of the channel currents is usually no more than 2% in order to evenly backlight a LCD screen.

FIG. 1 is a simplified conventional diagram showing a system for driving multiple channels of LEDs with a reference current. LED channels include channels $102_1, \ldots, 102_n$, where n is no less than 1, and each of these LED channels has one or more LEDs connected in series. A dynamic head room control unit 104 generates a control signal 106 which is received by a switching-mode power system 108. In response to the control signal 106, the switching-mode power system 108 generates a voltage signal 110 to one end of each of the LED channels $102_1, \ldots, 102_n$. Voltages at the other end of each of the LED channels $102_1, \ldots, 102_n$ are provided to the dynamic head room control unit 104.

In addition, a current balancing structure 112 includes a channel reference generator 116, and channel drivers $118_1, \ldots, 118_n$. The channel reference generator 116 receives a reference current 120, and generates channel driving currents $122_1, \ldots, 122_n$. The channel driving currents $122_1, \ldots, 122_n$ are received by the channel drivers $118_1, \ldots, 118_n$, respectively. Then the channel drivers $118_1, \ldots, 118_n$ provide channel currents $124_1, \ldots, 124_n$ to the LED channels $102_1, \ldots, 102_n$, respectively. The channel drivers $118_1, \ldots, 118_n$ can have similar structures and perform similar operations.

FIG. 2 is a simplified conventional diagram showing certain components of one of the channel drivers $118_1, \ldots, 118_n$. As shown, the channel driver 200 (e.g., the channel driver $118_1$) includes an operational amplifier 202, two resistors 204 and 206, and a transistor 208. For example, the transistor 208 is an N-P-N bipolar junction transistor (BJT). In another example, the operational amplifier 202 includes one or more N-P-N BJTs.

The channel driver 200 receives a current signal 210 (e.g., the channel driving current $122_1$) which flows through the resistor 204 (e.g., the resistor 128). The operational amplifier 202 receives a voltage signal 212 at an input terminal 216, and in response generates an amplified signal 218. The amplified signal 218 is received by the transistor 208 which is also coupled to another input terminal 220 of the operational amplifier 202. As a result, the transistor 208 generates a channel current 222 (e.g., the channel current $124_1$) which flows through a LED channel (e.g., the LED channel $102_1$), the transistor 208 (e.g., the transistor 132), and the resistor 206 (e.g., the resistor 130).

As shown in FIG. 2, the channel current 222 can be determined based on the following equation:

$$I_{out} = \frac{K \times R \times I_{ch} - V_{os}}{R} = \left(1 - \frac{V_{os}}{I_{ch} \times KR}\right) \times K \times I_{ch} \quad \text{(Equation 1)}$$

where $I_{out}$ represents the channel current 222, K×R represents the resistance of the resistor 204, and $I_{ch}$ represents the current signal 210. Additionally, $V_{os}$ represents an input offset of the operational amplifier 202, R represents the resistance of the resistor 206, K×R×$I_{ch}$ represents the voltage signal 212, and $V_{os}/R$ represents an error term.

Referring to FIGS. 1 and 2, various non-ideal factors can adversely affect the matching of channel currents $124_1, \ldots, 124_n$. These non-ideal factors include resistance mismatching, mismatching of channel driving currents, and the existence of input offset (e.g., $V_{os}$). Further, these non-ideal factors can change significantly with different manufacturing technologies. Thus, it is often difficult to match channel currents of different LED channels (e.g., the channel currents including $124_1, \ldots, 124_n$. Through proper device size and good layout matching, resistance magnitudes of different channels can be matched (e.g., within an error of about 0.1%), and driving currents of different channels can also be matched (e.g., within an error of about 1%). Therefore, the existence of input offset (e.g., $V_{os}$) can be a major factor in channel current mismatching.

For example, the voltage signal 212 is only about 100 mV or less. In contrast, the input offset (e.g., $V_{os}$) can be as large as 10 mV for the CMOS technology. Thus, it can be difficult to reduce the mismatching error of the channel currents of the different LED channels (e.g., the channel currents $124_1, \ldots, 124_n$) to less than or equal to 2%. In order to improve matching of the channel currents, one option is to use P-N-P BJTs in the operational amplifier 202. But, for such P-N-P BJTs, a lateral structure is often required, which can increase the manufacturing difficulty. Also, additional circuits may also be needed because the current gain (e.g., β) of a P-N-P BJT usually is lower than an N-P-N BJT.

Hence it is highly desirable to improve techniques of current matching of LED channels.

3. BRIEF SUMMARY OF THE INVENTION

The present invention is directed to integrated circuits. More particularly, the invention provides systems and methods for current matching. Merely by way of example, the invention has been applied to current matching of LED channels. But it would be recognized that the invention has a much broader range of applicability.

According to one embodiment, a system for generating a plurality of channel currents includes a channel reference generator, a first channel current divider, a second channel current divider, a first channel driver, and a second channel driver. The channel reference generator is configured to receive a first reference current and generate at least a first channel driving current and a second channel driving current. The first channel current divider is configured to receive the first channel driving current and generate a first input current, a second input current, and a third input current. The second channel current divider is configured to receive the second channel driving current and generate a fourth input current, a fifth input current, and a sixth input current. The first channel driver is configured to receive the first input current, the second input current, and the third input current and generate a first channel current. The second channel driver is configured to receive the fourth input current, the fifth input current, and the sixth input current and generate a second channel current. Moreover, a sum of the first input current and the second input current is equal to the first channel driving current. The second input current is equal to the third input current. A sum of the fourth input current and the fifth input current is equal to the second channel driving current. Furthermore, the fifth input current is equal to the sixth input current.

According to another embodiment, a system for generating a plurality of channel currents includes a channel reference generator, a first channel current divider, a second channel current divider, a first channel driver, and a second channel driver. The channel reference generator is configured to receive a first reference current and generate at least a first channel driving current and a second channel driving current. The first channel current divider is configured to receive the first channel driving current and generate a first input current, a second input current, and a third input current. The second channel current divider is configured to receive the second channel driving current and generate a fourth input current, a fifth input current, and a sixth input current. The first channel driver is configured to receive the first input current, the second input current, and the third input current and generate a first channel current. The second channel driver is configured to receive the fourth input current, the fifth input current, and the sixth input current and generate a second channel current. Furthermore, the first channel driver includes a first transistor including a first transistor terminal, a second transistor terminal, and a third transistor terminal, a second transistor including a fourth transistor terminal, a fifth transistor terminal, and a sixth transistor terminal, a first resistor associated with a first resistance and coupled to the third transistor terminal at a first voltage, and a second resistor associated with a second resistance and coupled to the sixth transistor terminal at a second voltage. Additionally, the first transistor terminal and the fourth transistor terminal are coupled. The second transistor terminal is configured to receive the second input current. The fifth transistor terminal is configured to receive the third input current. Moreover, a multiplication of the first resistance and a sum of the second input current and the first channel current is equal to a first magnitude. A multiplication of the second resistance and a sum of the first input current and the third input current is equal to a second magnitude. The first magnitude is equal to the second magnitude minus an offset voltage. The offset voltage is equal to a difference between the second voltage and the first voltage in magnitude.

According to yet another embodiment, a method for generating a plurality of channel currents includes receiving a first reference current, generating at least a first channel driving current and a second channel driving current, and processing information associated with the first channel driving current and the second channel driving current. Further, the method includes generating a first input current, a second input current, and a third input current based on at least information associated with the first channel driving current, processing information associated with the first input current, the second input current, and the third input current, generating a fourth input current, a fifth input current, and a sixth input current based on at least information associated with the second channel driving current, and processing information associated with the fourth input current, the fifth input current, and the sixth input current. Additionally, the method includes generating a first channel current based on at least information associated with the first input current, the second input current, and the third input current, and generating a second channel current based on at least information associated with the fourth input current, the fifth input current, and the sixth input current. Moreover, a sum of the first input current and the second input current is equal to the first channel driving current. The second input current is equal to the third input current. A sum of the fourth input current and the fifth input current is equal to the second channel driving current. The fifth input current is equal to the sixth input current.

According to yet another embodiment, a method for generating a plurality of channel currents includes receiving a first reference current, generating at least a first channel driving current and a second channel driving current, and processing information associated with the first channel driving current and the second channel driving current. The method further includes generating a first input current, a second input current, and a third input current based on at least information associated with the first channel driving current, processing information associated with the first input current, the second input current, and the third input current, generating a fourth input current, a fifth input current, and a sixth input current based on at least information associated with the second channel driving current, and processing information associated with the fourth input current, the fifth input current, and the sixth input current. Furthermore, the method includes generating a first channel current based on at least information associated with the first input current, the second input current, and the third input current, and generating a second channel current based on at least information associated with the fourth input current, the fifth input current, and the sixth input current. Moreover, a multiplication of a first resistance and a sum of the second input current and the first channel current is equal to a first magnitude. A multiplication of a second resistance and a sum of the first input current and the third input current is equal to a second magnitude. The first magnitude is equal to the second magnitude minus an offset voltage.

Depending upon embodiment, one or more benefits may be achieved. These benefits and various additional objects, features and advantages of the present invention can be fully appreciated with reference to the detailed description and accompanying drawings that follow.

4. BRIEF DESCRIPTION OF THE DRAWINGS

5. DETAILED DESCRIPTION OF THE INVENTION

The present invention is directed to integrated circuits. More particularly, the invention provides systems and methods for current matching. Merely by way of example, the invention has been applied to current matching of LED channels. But it would be recognized that the invention has a much broader range of applicability.

Figure 1:
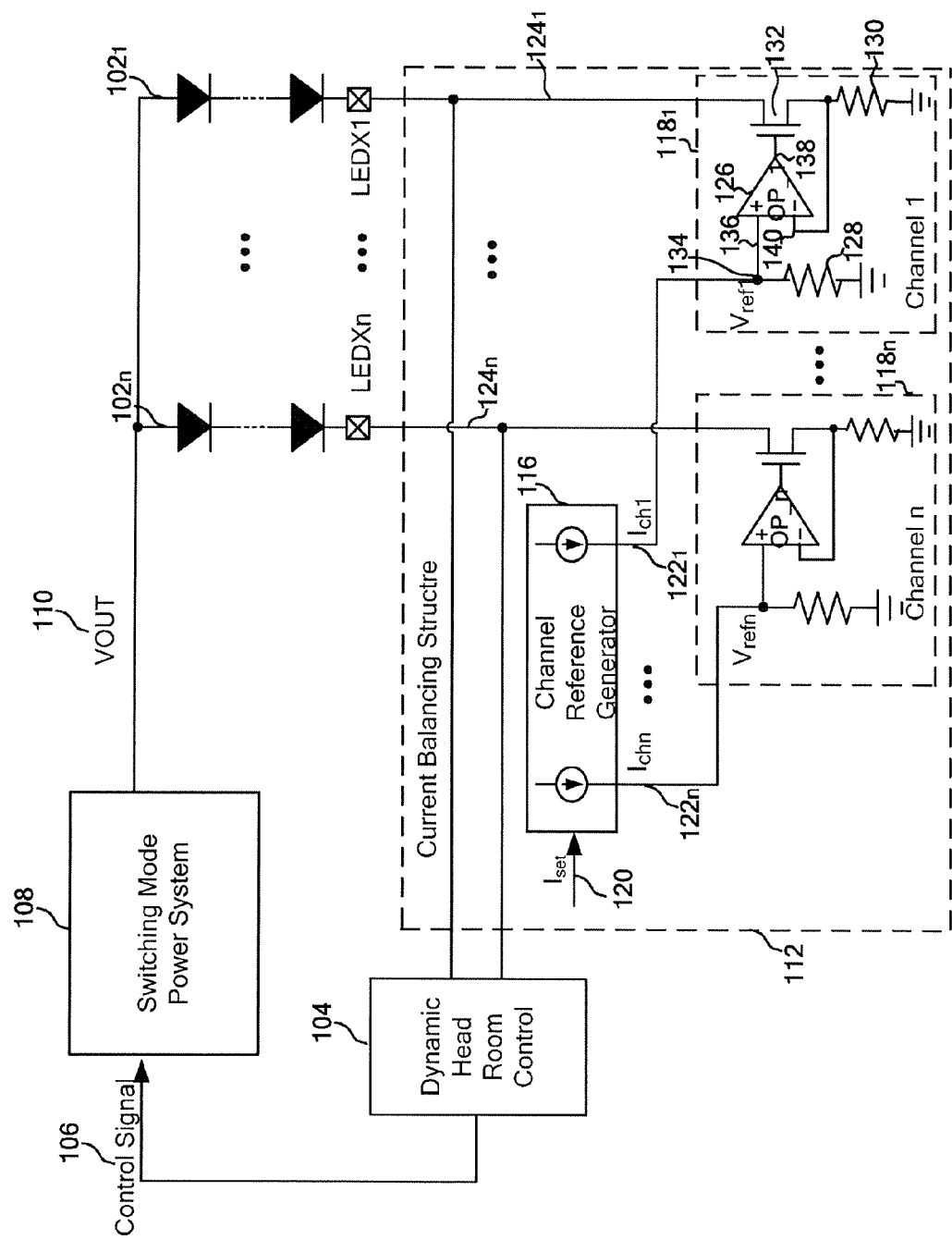
FIG. 1 is a simplified conventional diagram showing a system for driving multiple channels of LEDs with a reference current.
Figure 2:
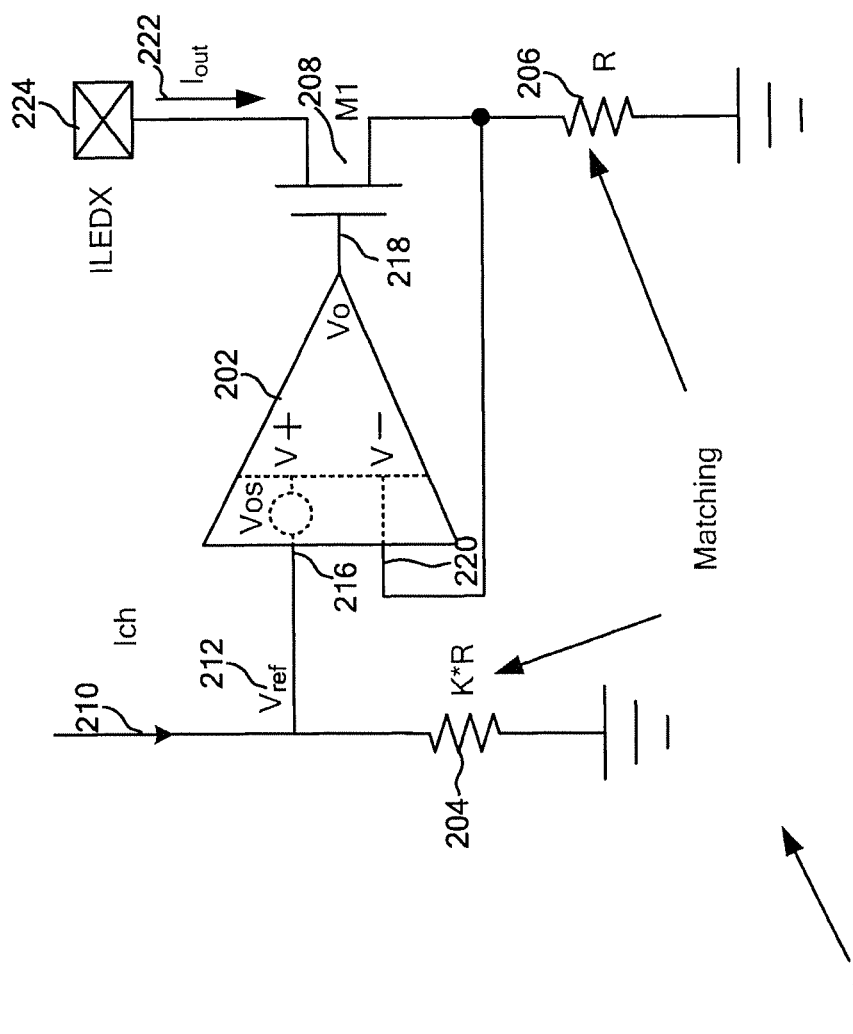
FIG. 2 is a simplified conventional diagram showing certain components of one of the channel drivers.
Figure 3:
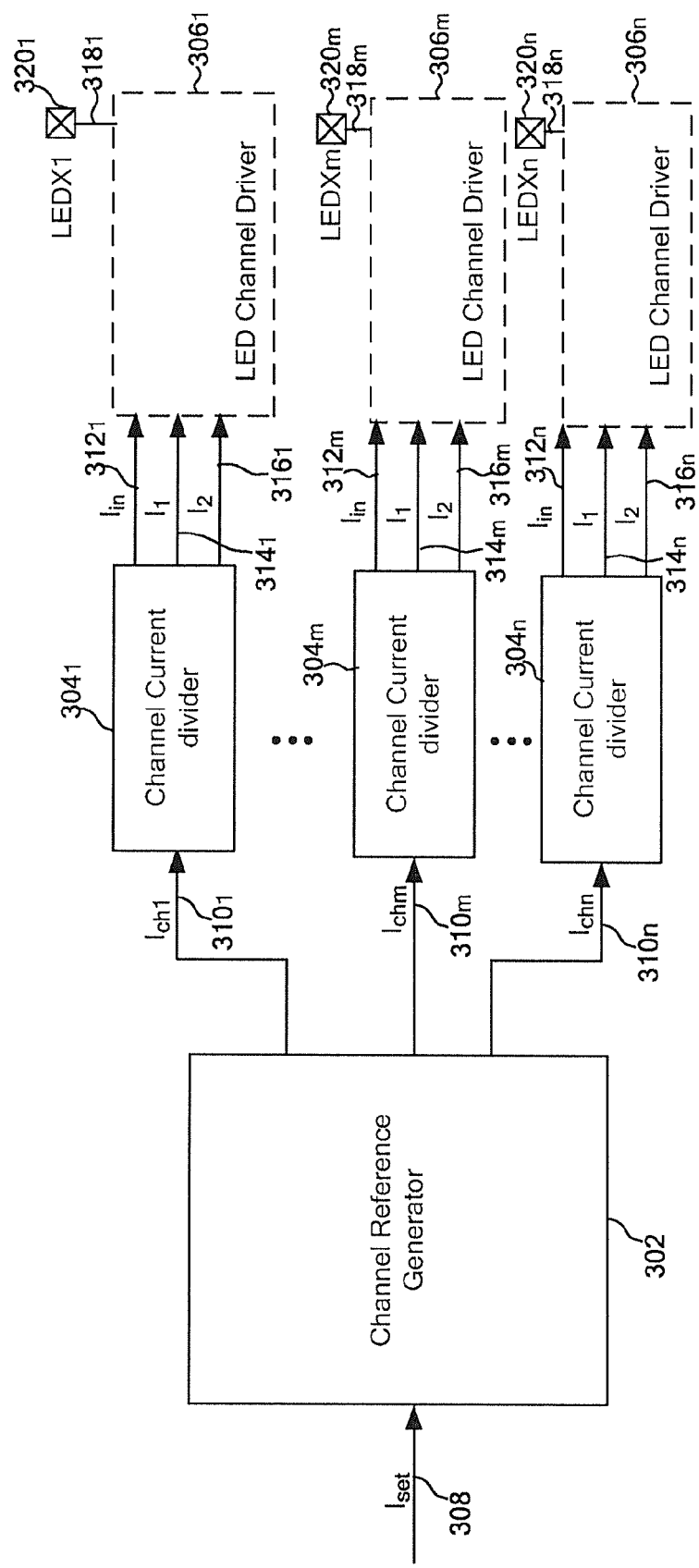
FIG. 3 is a simplified diagram showing a current matching system for LED channels according to an embodiment of the present invention.

FIG. 3 is a simplified diagram showing a current matching system for LED channels according to an embodiment of the present invention. This diagram is merely an example, which should not unduly limit the scope of the claims. One of ordinary skill in the art would recognize many variations, alternatives, and modifications. The current matching system 300 includes a channel reference generator 302, one or more channel current dividers $304_1, \ldots, 304_m, \ldots,$ and $304_n$, and one or more LED channel drivers $306_1, \ldots, 306_m, \ldots,$ and $306_n$, where n and m each are a positive integer, and m≤n.

According to one embodiment, the channel reference generator 302 receives a reference current 308, and generates channel driving currents $310_1, \ldots, 310_m, \ldots,$ and $310_n$. For example, the channel driving currents are matched (e.g., within an error of no more than 1%). According to another embodiment, the channel current dividers $304_1, \ldots, 304_m, \ldots,$ and $304_n$ receive the channel driving currents $310_1, \ldots, 310_m, \ldots,$ and $310_n$, respectively. In response to the received channel driving currents, the channel current dividers $304_1, \ldots, 304_m, \ldots,$ and $304_n$ generates input currents (e.g., $312_1, \ldots, 312_m, \ldots, 312_n, 314_1, \ldots, 314_m, \ldots, 314_n$, $316_1, \ldots, 316_m, \ldots, 316_n$) for the LED channel drivers $306_1, \ldots, 306_m, \ldots,$ and $306_n$, respectively. For example, the channel current divider $304_m$ receives the channel driving current $310_m$, and in response generates three input currents $312_m, 314_m,$ and $316_m$, which are received by the LED channel driver $306_m$.

In another example, the input current $314_m$ is proportional to the current $316_m$ by a predetermined ratio (e.g., the predetermined ratio being equal to 1). In yet another example, the channel driving current $310_m$ is proportional to the sum of the current $316_m$ and the current $312_m$ by a predetermined ratio (e.g., the predetermined ratio being equal to 1). In yet another example, $$I_{ch}=I_{in}+I_2 \quad \text{(Equation 2)}$$

and $$I_1=I_2 \quad \text{(Equation 3)}$$

wherein $I_{ch}$ represents the channel driving current $310_m$. Additionally, $I_{in}$ represents the input currents $312_m$, $I_1$ represents the input current $314_m$, and $I_2$ represents the input current $316_m$.

Figure 4:
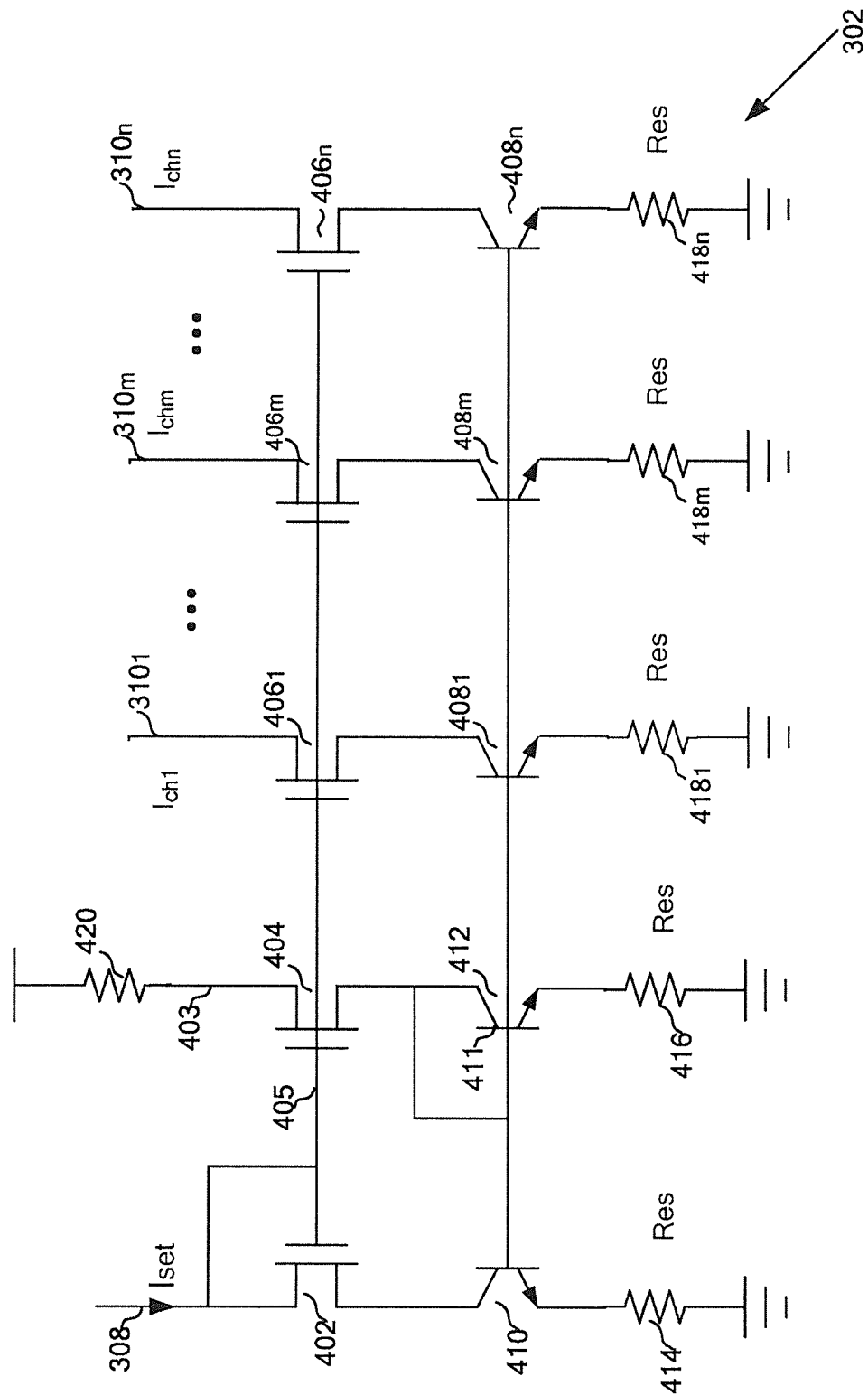
FIG. 4 is a simplified diagram showing certain components of the channel reference generator as part of the current matching system according to an embodiment of the present invention.

According to yet another embodiment, the LED channel drivers $306_1, \ldots, 306_m, \ldots,$ and $306_n$ receive the input currents from the channel current dividers $304_1, \ldots, 304_m, \ldots,$ and $304_n$, respectively. In response, the LED channel drivers $306_1, \ldots, 306_m, \ldots,$ and $306_n$ generate channel currents $318_1, \ldots, 318_m, \ldots,$ and $318_n$, respectively. According to yet another embodiment, the channel currents $318_1, \ldots, 318_m, \ldots,$ and $318_n$ flow through output terminals $320_1, \ldots, 320_m, \ldots,$ and $320_n$, respectively, for driving corresponding LED channels. FIG. 4 is a simplified diagram showing certain components of the channel reference generator 302 as part of the current matching system 300 according to an embodiment of the present invention. This diagram is merely an example, which should not unduly limit the scope of the claims. One of ordinary skill in the art would recognize many variations, alternatives, and modifications. The channel reference generator 302 includes transistors 402, 404, 410 and 412, and resistors 414, 416 and 420. Additionally, the channel reference generator 302 includes transistors $406_1, \ldots, 406_m, \ldots,$ and $406_n$, and transistors $408_1, \ldots, 408_m, \ldots,$ and $408_n$. Moreover, the channel reference generator 302 includes resistors $418_1, \ldots, 418_m, \ldots,$ and $418_n$. n and m each are a positive integer, and m≤n.

For example, the transistors 402 and 404, and the transistors $406_1, \ldots, 406_m, \ldots,$ and $406_n$ are n-channel field effect transistors (FETs). In another example, the transistors 410 and 412, and the transistors $408_1, \ldots, 408_m, \ldots,$ and $408_n$ are N-P-N BJTs. In yet another example, the transistors 402, 404, 410 and 412, and the resistors 414, 416 and 420 form a current mirror circuit. In yet another example, the resistors 414 and 416, and the resistors $418_1, \ldots, 418_m, \ldots,$ and $418_n$ all have the same resistance.

According to one embodiment, the channel reference generator 302 receives the reference current 308 which flows through the transistors 402 and 410. For example, the reference current 308 is mirrored, with a predetermined ratio, to generate a current 403 that flows through the transistors 404 and 412. In another example, the transistor 402 includes a gate terminal, which outputs a gate voltage signal 405 to the transistor 404 and the transistors $406_1, \ldots, 406_m, \ldots,$ and $406_n$. Additionally, the transistors $408_1, \ldots, 408_m, \ldots,$ and $408_n$ each receive a base current 411 from the base terminal of the transistor 412.

As shown in FIG. 4, the transistors $406_1, \ldots, 406_m, \ldots,$ and $406_n$ generate the channel driving currents $310_1, \ldots, 310_m, \ldots,$ and $310_n$ respectively, according to one embodiment. For example, the channel driving current $310_m$ is generated by the transistors $406_m$ and $408_m$ and the resistor $418_m$. In another example, the voltage drop on each of the resistors $418_1, \ldots, 418_m, \ldots,$ and $418_n$ is far larger than a thermal voltage which equals about 26 mV at room temperature. In yet another example, if the resistance magnitudes of the resistors $418_1, \ldots, 418_m, \ldots,$ and $418_n$ are sufficiently matched and the common-base current gains (e.g., α) of the transistors $408_1, \ldots, 408_m, \ldots,$ and $408_n$ are also sufficiently matched, the channel driving currents $310_1, \ldots, 310_m, \ldots,$ and $310_n$ can be matched (e.g., within an error of no more than 1%).

Figure 5:
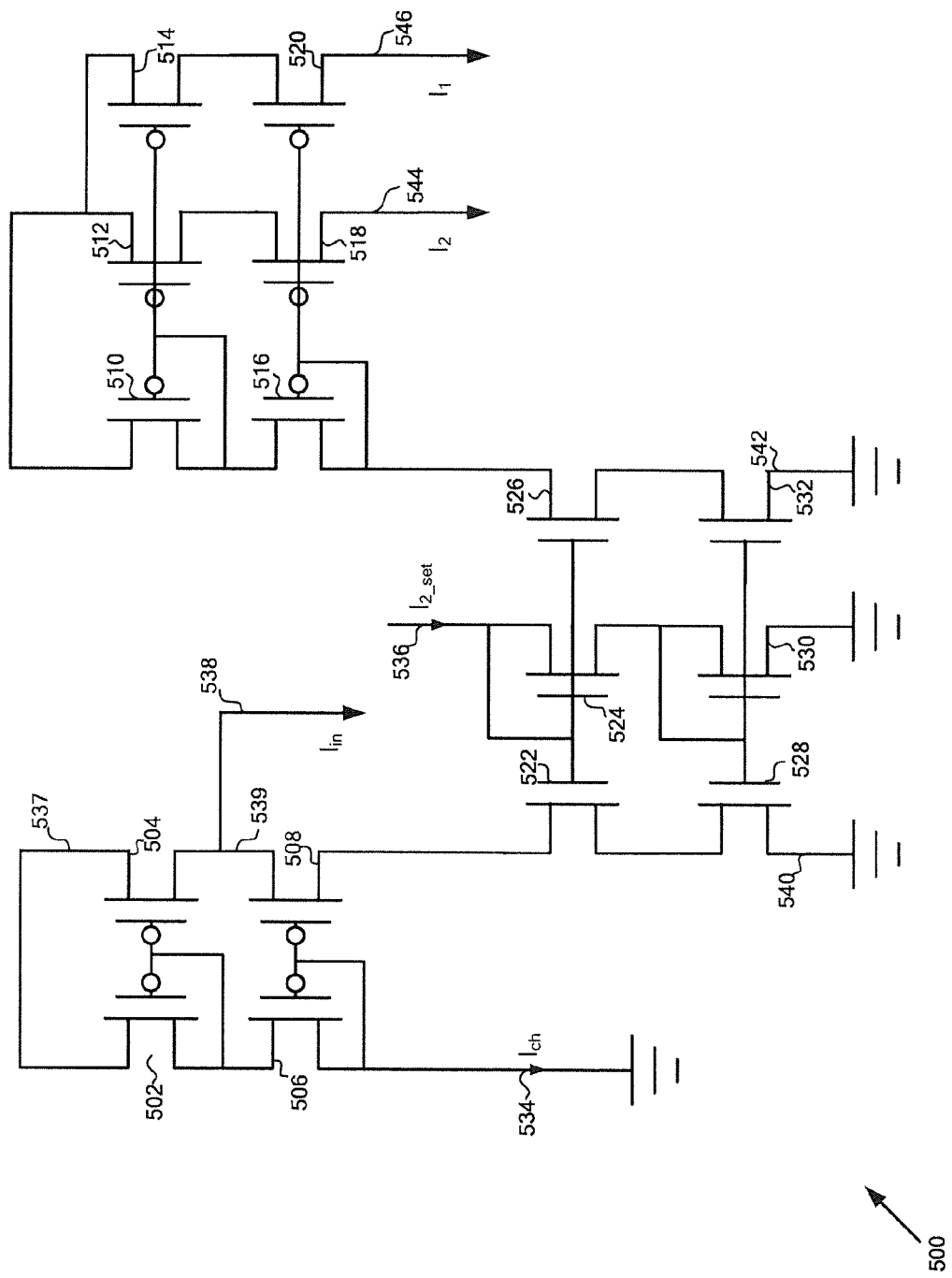
FIG. 5 is a simplified diagram showing certain components of one of the channel current dividers as parts of the current matching system according to an embodiment of the present invention.

FIG. 5 is a simplified diagram showing certain components of one of the channel current dividers $304_1, \ldots, 304_m, \ldots,$ and $304_n$ as parts of the current matching system 300 according to an embodiment of the present invention. This diagram is merely an example, which should not unduly limit the scope of the claims. One of ordinary skill in the art would recognize many variations, alternatives, and modifications. The channel current divider 500 (e.g., the channel current divider $304_m$) includes transistors 502, 504, 506, 508, 510, 512, 514, 516, 518, 520, 522, 524, 526, 528, 530, and 532. For example, the transistors 502, 504, 506, 508, 510, 512, 514, 516, 518, and 520 are p-channel FETs, and the transistors 522, 524, 526, 528, 530, and 532 are n-channel FETs.

According to yet another embodiment, the transistors 522, 524, 526, 528, 530 and 532 form a first current mirror circuit. For example, in the first current mirror circuit, the transistors 524 and 530 form a first circuit branch, the transistors 522 and 528 form a second circuit branch, and the transistors 526 and 532 form a third circuit branch. In another example, the first circuit branch, the second circuit branch, and the third circuit branch are mutually coupled. According to yet another embodiment, the transistors 502, 504, 506 and 508 form a second current mirror circuit. For example, in the second current mirror circuit, the transistors 502 and 506 form a fourth circuit branch, and the transistors 504 and 508 form a fifth circuit branch. In another example, the fourth circuit branch and the fifth circuit branch are coupled. According to yet another embodiment, the transistors 510, 512, 514, 516, 518 and 520 form a third current mirror circuit. For example, in the third current mirror circuit, the transistors 510 and 516 form a sixth circuit branch, the transistors 512 and 518 form a seventh circuit branch, and the transistors 514 and 520 form an eighth circuit branch. In another example, the sixth circuit branch, the seventh circuit branch, and the eighth circuit branch are mutually coupled.

Referring to FIGS. 3 and 5, the channel current divider 500 (e.g., the channel current divider $304_m$) receives a channel driving current 534 (e.g., the channel driving current $310_m$) from a channel reference generator (e.g., the channel reference generator 302) according to one embodiment. According to another embodiment, in response, the channel current divider 500 (e.g., the channel current divider $304_m$) generates a current 538 (e.g., the current $312_m$), a current 544 (e.g., the current $316_m$), and a current 546 (e.g., the current $314_m$), all of which are received to a LED channel driver (e.g., the LED channel driver $306_m$).

According to yet another embodiment, the current 538 is generated by diverting at least a portion of a current 537 that is mirrored from the channel driving current 534 with a predetermined ratio. For example, the channel driving current 534 is proportional to the sum of the current 538 and the current 544 by a predetermined ratio (e.g., the predetermined ratio being equal to 1). In another embodiment, the currents 544 and 546 each are generated by mirroring a reference current 536 with a predetermined ratio. For example, the current 544 is proportional to the current 546 by a predetermined ratio (e.g., the predetermined ratio being equal to 1). In yet another example, the channel driving current 534, and the currents 538, 544 and 546 follow Equations 2 and 3, wherein $I_{ch}$ represents the channel driving current 534, $I_{in}$ represents the current 538, $I_1$ represents the current 546, and $I_2$ represents the current 544.

In another embodiment, the channel current divider 500 receives the channel driving current 534 (e.g., the channel driving current $310_m$) from a channel reference generator (e.g., the channel reference generator 302). For example, the channel driving current 534 flows through the transistors 502 and 506, and is mirrored, with a predetermined ratio, by the transistor 504 to generate the current 537. In another example, the current 537 flows through the transistors 504 and is divided into currents 538 and 539. In another embodiment, the current 538 is sent, as an input current (e.g., the current $312_m$), to a LED channel driver (e.g., the LED channel driver $306_m$) as shown in FIG. 3. For example, the magnitude of the current 538 is a fraction of the magnitude of the current 537.

As shown in FIG. 5, the channel current divider 500 receives the reference current 536, which flows through the transistors 524 and 530 according to one embodiment. For example, the reference current 536 is mirrored, with a predetermined ratio, by the transistor 528 to generate a current 540, which flows through the transistors 522, 528 and 508. For example, the current 540 is equal to the current 539 in magnitude. In another example, a sum of the current 540 and the current 538 is equal to the current 537.

According to another embodiment, the reference current 536 is also mirrored by the transistor 532 to generate a current 542, which is further mirrored by the transistor 512 to generate the current 544 and is also further mirrored by the transistor 514 to generate the current 546. For example, the current 544 flows through the transistors 512 and 518, and the current 546 flows through the transistors 514 and 520. In another example, the currents 544 and 546 are sent, as input currents (e.g., the currents $316_m$ and $314_m$ respectively) to a LED channel driver (e.g., the LED channel driver $306_m$) as shown in FIG. 3.

Figure 6:
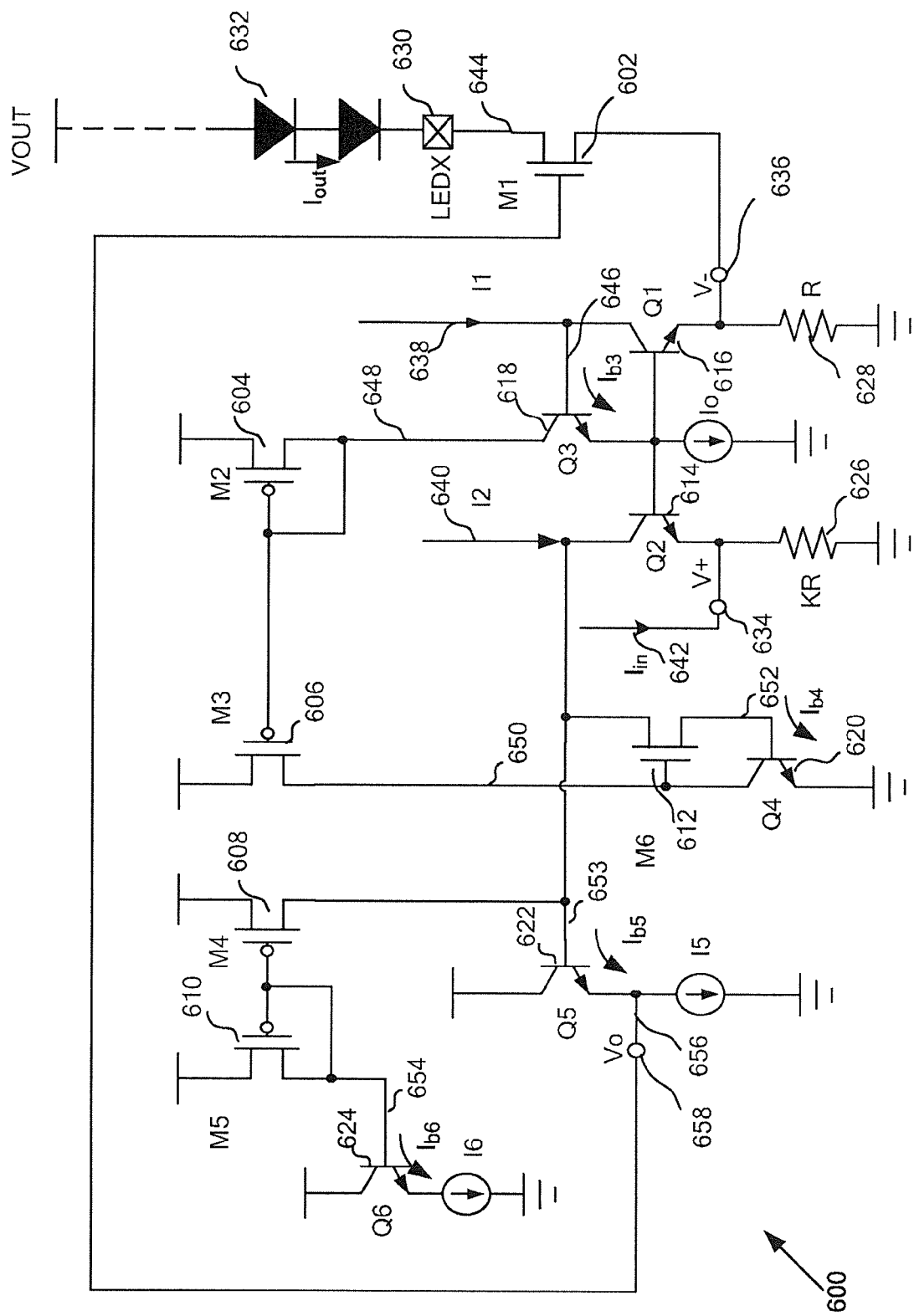
FIG. 6 is a simplified diagram showing certain components of one of the LED channel drivers as parts of the current matching system according to an embodiment of the present invention.

FIG. 6 is a simplified diagram showing certain components of one of the LED channel drivers $306_1, \ldots, 306_m, \ldots,$ and $306_n$ as parts of the current matching system 300 according to an embodiment of the present invention. This diagram is merely an example, which should not unduly limit the scope of the claims. One of ordinary skill in the art would recognize many variations, alternatives, and modifications. The LED channel driver 600 (e.g., the LED channel driver $306_m$) includes transistors 602, 604, 606, 608, 610, 612, 614, 616, 618, 620, 622, and 624, and resistors 626 and 628. For example, the transistors 602 and 612 are n-channel FETs, the transistors 604, 606, 608 and 610 are p-channel FETs, and the transistors 614, 616, 618, 620, 622, and 624 are N-P-N BJTs. In another example, the transistors 604 and 606 form a first current mirror circuit, and the transistors 608 and 610 form a second current mirror circuit.

In one embodiment, the LED channel driver 600 receives, from a channel current divider (e.g., the channel current divider $304_m$ and/or the channel current divider 500), three input currents 638, 640 and 642. For example, the input currents 638, 640 and 642 are the input currents $314_m$, $316_m$ and $312_m$, respectively. In another example, the input currents 638, 640 and 642 are the input currents 546, 544 and 538, respectively.

In response, the transistor 622 outputs a voltage signal 656 to the transistor 602 (e.g., through a terminal 658) according to one embodiment. For example, the transistor 602 receives the voltage signal 656 and generates a channel current 644 for driving a channel of one or more LEDs 632. In another example, the channel current 644 flows from the one or more LEDs 632 to the transistor 602 through a terminal 630 (e.g., the terminal $320_m$).

Figure 7:
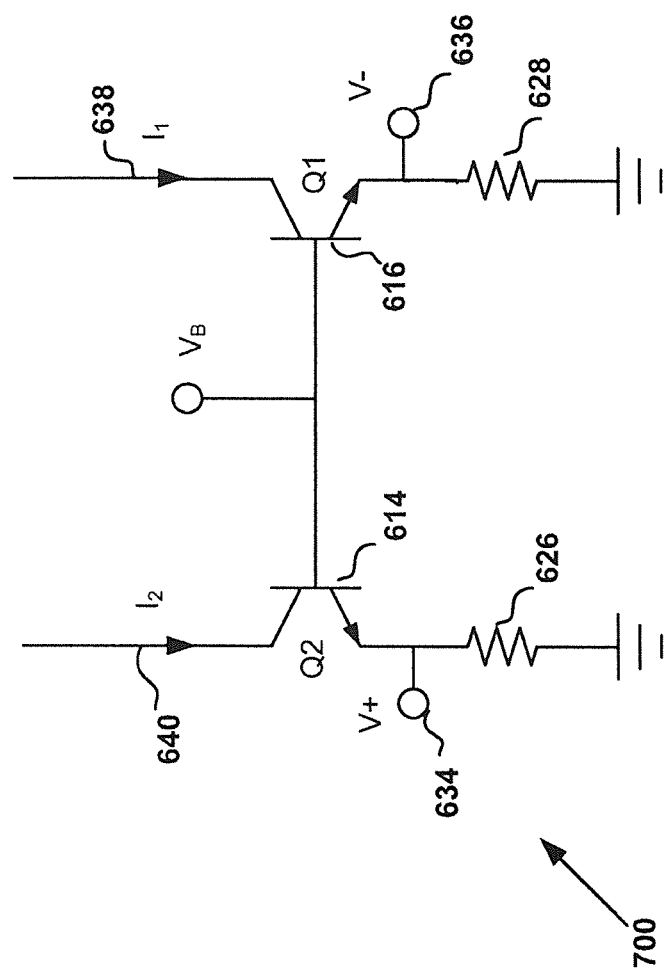
FIG. 7 is a simplified diagram showing a common base input structure for the LED channel driver used as part of the current matching system according to an embodiment of the present invention.

FIG. 7 is a simplified diagram showing a common base input structure for the LED channel driver 600 used as part of the current matching system 300 according to an embodiment of the present invention. This diagram is merely an example, which should not unduly limit the scope of the claims. One of ordinary skill in the art would recognize many variations, alternatives, and modifications. The common base input structure 700 includes the transistors 614 and 616, the resistors 626 and 628, and terminals 634 and 636.

In one embodiment, the base of the transistor 614 and the base of the transistor 616 are coupled together. For example, the transistor 614 receives the input current 640, and the transistor 616 receives the input current 638. In another example, the input currents 638 and 640 are equal in magnitude. In another embodiment, the transistors 614 and 616 are coupled to the terminals 634 and 636 respectively. For example, the voltage difference between the terminals 634 and 636 are determined as follows:

$$\Delta V = V_{BE1} - V_{BE2} \quad \text{(Equation 4)}$$
$$= V_T \ln\left(\frac{I_{c1}}{I_{s1}}\right) - V_T \ln\left(\frac{I_{c2}}{I_{s2}}\right)$$
$$= V_T \ln\left(\frac{I_{c1} I_{s2}}{I_{c2} I_{s1}}\right)$$

where $\Delta V$ represents the voltage between terminals 634 and 636, and $V_T$ represents a thermal voltage. Additionally, $I_{c1}$ represents the input current 640, $I_{c2}$ represents the input current 638, and $I_{s1}$ and $I_{s2}$ represent reverse saturation currents of the transistors 614 and 616, respectively. For example, by adjusting device sizes and layout patterns, $I_{c1}$ (e.g., the input current 640) and $I_{c2}$ (e.g., the input current 638) can be matched (e.g., within an error of no more than 2%), and $I_{s1}$ and $I_{s2}$ can also be matched (e.g., within an error of no more than 1%). At room temperature, $V_T$ equals about 26 mV; hence $\Delta V$ (e.g., the voltage difference between terminals 634 and 636) can be reduced to about 1 mV according to one embodiment.

Referring back to FIG. 6, in another embodiment, the transistors 604, 606, 612 and 620 are used to compensate the base current 646 as at least a part of the input current 638. For example, the base current 646 is received by the transistor 618, which generates a current 648 flowing through the transistor 604. In another example, the current 648 is mirrored by the transistor 606, with a predetermined ratio, to generate a current 650 that flows through the transistor 620. In yet another example, the transistor 612 draws at least a portion of the input current 640 to provide a base current 652 to the transistor 620. In yet another example, the base current 652 and the base current 646 are equal in magnitude.

In yet another embodiment, the transistor 622 draws a base current 653 from the input current 640. For example, the base current 653 is compensated by the transistors 608, 610, and 624. In another example, the transistor 610 outputs a current 654 to the transistor 624 as a base current. In yet another example, the current 654 is mirrored by the transistor 608, with a predetermined ratio, to generate a current to compensate for the base current 653 in order to reduce the matching error of the input currents 638 and 640.

According to some embodiments, even though the currents 646 and 653 are small in magnitude (e.g., in the order of nano-amps), these currents 646 and 653 are diverted from the input currents 638 and 640 respectively. Hence, the compensation for the loss of these diverted currents can reduce the matching error of the input currents 638 and 640 and thus reduce the voltage difference between the terminals 634 and 636 for better channel current matching according to certain embodiments.

For example, the channel current 644 is determined as follows:

$$(I_{in}+I_2) \times K \times R - V_{os} = (I_{out}+I_1) \times R \quad \text{(Equation 5)}$$

where represents the input current 642, $I_1$ represents the input current 638, $I_2$ represents the input current 640, and $I_{out}$ represents the channel current 644. Additionally, K×R represents the resistance of the resistor 626, and R represents the resistance of the resistor 628. Moreover, $V_{os}$ represents the voltage difference between the terminals 634 and 636.

In another example, if $I_{out}$ is equal to 40 mA, R is equal to 5Ω, K is equal to 1000, and $I_{in}$ is equals 16 μA, and if $I_1$ and $I_2$ each are equal to 4 μA, Equation 5 is simplified to the following form:

$$(I_{in}+I_2) \times K \times R - V_{os} = I_{out} \times R \quad \text{(Equation 6)}.$$

In yet another example, using Equations 2 and 6, the channel current 644 can be determined as follows:

$$I_{out} = \left(1 - \frac{V_{os}}{I_{ch} \times K \times R}\right) \times K \times I_{ch} \quad \text{(Equation 7)}$$

According to some embodiments, between different LED channel drivers, R and K×R each can be matched within an error of no more than 1%, through proper adjustment of device size and layout pattern. Additionally, for example, $V_{os}$ is also reduced to no more than 1 mV, by matching the currents 640 and 638 (e.g., within an error of no more than 2%) and reducing the voltage difference between terminals 634 and 636 as shown in FIGS. 6 and 7. Hence the matching error of $I_{out}$ between different LED channel drivers can be reduced to no more than 2% according to certain embodiments.

According to another embodiment, a system for generating a plurality of channel currents includes a channel reference generator, a first channel current divider, a second channel current divider, a first channel driver, and a second channel driver. The channel reference generator is configured to receive a first reference current and generate at least a first channel driving current and a second channel driving current. The first channel current divider is configured to receive the first channel driving current and generate a first input current, a second input current, and a third input current. The second channel current divider is configured to receive the second channel driving current and generate a fourth input current, a fifth input current, and a sixth input current. The first channel driver is configured to receive the first input current, the second input current, and the third input current and generate a first channel current. The second channel driver is configured to receive the fourth input current, the fifth input current, and the sixth input current and generate a second channel current. Moreover, a sum of the first input current and the second input current is equal to the first channel driving current. The second input current is equal to the third input current. A sum of the fourth input current and the fifth input current is equal to the second channel driving current. Furthermore, the fifth input current is equal to the sixth input current. For example, the system is implemented according to FIG. 3, FIG. 4, FIG. 5, FIG. 6, and FIG. 7.

According to yet another embodiment, a system for generating a plurality of channel currents includes a channel reference generator, a first channel current divider, a second channel current divider, a first channel driver, and a second channel driver. The channel reference generator is configured to receive a first reference current and generate at least a first channel driving current and a second channel driving current. The first channel current divider is configured to receive the first channel driving current and generate a first input current, a second input current, and a third input current. The second channel current divider is configured to receive the second channel driving current and generate a fourth input current, a fifth input current, and a sixth input current. The first channel driver is configured to receive the first input current, the second input current, and the third input current and generate a first channel current. The second channel driver is configured to receive the fourth input current, the fifth input current, and the sixth input current and generate a second channel current. Furthermore, the first channel driver includes a first transistor including a first transistor terminal, a second transistor terminal, and a third transistor terminal, a second transistor including a fourth transistor terminal, a fifth transistor terminal, and a sixth transistor terminal, a first resistor associated with a first resistance and coupled to the third transistor terminal at a first voltage, and a second resistor associated with a second resistance and coupled to the sixth transistor terminal at a second voltage. Additionally, the first transistor terminal and the fourth transistor terminal are coupled. The second transistor terminal is configured to receive the second input current. The fifth transistor terminal is configured to receive the third input current. Moreover, a multiplication of the first resistance and a sum of the second input current and the first channel current is equal to a first magnitude. A multiplication of the second resistance and a sum of the first input current and the third input current is equal to a second magnitude. The first magnitude is equal to the second magnitude minus an offset voltage. The offset voltage is equal to a difference between the second voltage and the first voltage in magnitude. For example, the system is implemented according to FIG. 3, FIG. 4, FIG. 5, FIG. 6, and FIG. 7.

According to yet another embodiment, a method for generating a plurality of channel currents includes receiving a first reference current, generating at least a first channel driving current and a second channel driving current, and processing information associated with the first channel driving current and the second channel driving current. Further, the method includes generating a first input current, a second input current, and a third input current based on at least information associated with the first channel driving current, processing information associated with the first input current, the second input current, and the third input current, generating a fourth input current, a fifth input current, and a sixth input current based on at least information associated with the second channel driving current, and processing information associated with the fourth input current, the fifth input current, and the sixth input current. Additionally, the method includes generating a first channel current based on at least information associated with the first input current, the second input current, and the third input current, and generating a second channel current based on at least information associated with the fourth input current, the fifth input current, and the sixth input current. Moreover, a sum of the first input current and the second input current is equal to the first channel driving current. The second input current is equal to the third input current. A sum of the fourth input current and the fifth input current is equal to the second channel driving current. The fifth input current is equal to the sixth input current. For example, the method is implemented according to at least FIG. 3, FIG. 4, FIG. 5, and FIG. 6.

According to yet another embodiment, a method for generating a plurality of channel currents includes receiving a first reference current, generating at least a first channel driving current and a second channel driving current, and processing information associated with the first channel driving current and the second channel driving current. The method further includes generating a first input current, a second input current, and a third input current based on at least information associated with the first channel driving current, processing information associated with the first input current, the second input current, and the third input current, generating a fourth input current, a fifth input current, and a sixth input current based on at least information associated with the second channel driving current, and processing information associated with the fourth input current, the fifth input current, and the sixth input current. Furthermore, the method includes generating a first channel current based on at least information associated with the first input current, the second input current, and the third input current, and generating a second channel current based on at least information associated with the fourth input current, the fifth input current, and the sixth input current. Moreover, a multiplication of a first resistance and a sum of the second input current and the first channel current is equal to a first magnitude. A multiplication of a second resistance and a sum of the first input current and the third input current is equal to a second magnitude. The first magnitude is equal to the second magnitude minus an offset voltage. For example, the method is implemented according to FIG. 3, FIG. 4, FIG. 5, FIG. 6, and FIG. 7.

For example, some or all components of various embodiments of the present invention each are, individually and/or in combination with at least another component, implemented using one or more software components, one or more hardware components, and/or one or more combinations of software and hardware components. In another example, some or all components of various embodiments of the present invention each are, individually and/or in combination with at least another component, implemented in one or more circuits, such as one or more analog circuits and/or one or more digital circuits. In yet another example, various embodiments and/or examples of the present invention can be combined.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A system for generating a plurality of channel currents, the system comprising:
   a channel reference generator configured to receive a first reference current and generate at least a first channel driving current and a second channel driving current;
   a first channel current divider configured to receive the first channel driving current and generate a first input current, a second input current, and a third input current;
   a second channel current divider configured to receive the second channel driving current and generate a fourth input current, a fifth input current, and a sixth input current;
   a first channel driver configured to receive the first input current, the second input current, and the third input current and generate a first channel current; and
   a second channel driver configured to receive the fourth input current, the fifth input current, and the sixth input current and generate a second channel current;
   wherein:
      a sum of the first input current and the second input current is equal to the first channel driving current;
      the second input current is equal to the third input current;
      a sum of the fourth input current and the fifth input current is equal to the second channel driving current; and
      the fifth input current is equal to the sixth input current.

2. The system of claim 1 wherein:
   the first channel driver is further configured to output the first channel current to one or more first light emitting diodes corresponding to a first channel; and the second channel driver is further configured to output the second channel current to one or more second light emitting diodes corresponding to a second channel.

3. The system of claim 2 wherein:
the first channel current flows from the one or more first light emitting diodes into the first channel driver; and
the second channel current flows from the one or more second light emitting diodes into the second channel driver.

4. The system of claim 1 wherein the first channel driver includes:
a first transistor including a first transistor terminal, a second transistor terminal, and a third transistor terminal; and
a second transistor including a fourth transistor terminal, a fifth transistor terminal, and a sixth transistor terminal;
wherein:
the first transistor terminal and the fourth transistor terminal are coupled;
the second transistor terminal is configured to receive the second input current; and
the fifth transistor terminal is configured to receive the third input current.

5. The system of claim 4 wherein the first channel driver further includes:
a first resistor associated with a first resistance and coupled to the third transistor terminal at a first voltage; and
a second resistor associated with a second resistance and coupled to the sixth transistor terminal at a second voltage;
wherein:
a multiplication of the first resistance and a sum of the second input current and the first channel current is equal to a multiplication of the second resistance and a sum of the first input current and the third input current minus an offset voltage; and
the offset voltage is equal to a difference between the second voltage and the first voltage in magnitude.

6. The system of claim 5 wherein the first resistance is proportional to the second resistance in magnitude.

7. The system of claim 4 wherein:
the first transistor is a first bipolar junction transistor;
the second transistor is a second bipolar junction transistor;
the first transistor terminal is a first base terminal; and
the fourth transistor terminal is a second base terminal.

8. The system of claim 7 wherein the first channel driver further includes:
a third transistor including a third base terminal, a seventh transistor terminal, and an eighth transistor terminal;
wherein:
the third base terminal and the second transistor terminal are coupled;
the eighth transistor terminal, the first base terminal, and the second base terminal are coupled;
the first transistor is configured to receive a first base current from the third transistor at the eighth transistor terminal;
the second transistor is configured to receive a second base current from the third transistor at the eighth transistor terminal; and
the third transistor is configured to receive at least a portion of the second input current as a third base current.

9. The system of claim 8 wherein the first channel driver further includes:
a fourth transistor including a fourth base terminal, a ninth transistor terminal, and a tenth transistor terminal; and
a first current mirror circuit;
wherein:
the first current mirror circuit is coupled to the third transistor at the seventh transistor terminal;
the first current mirror circuit is coupled to the fourth transistor at the ninth transistor terminal;
the fourth transistor is configured to receive at least a portion of the third input current as a fourth base current; and
the first current mirror circuit is configured to mirror a first current flowing through the third transistor to generate a second current flowing through the fourth transistor, the fourth base current being equal in magnitude to the third base current.

10. The system of claim 9 wherein the fourth transistor is further configured to receive, through another transistor, at least the portion of the third input current as the fourth base current.

11. The system of claim 9 wherein the first channel driver further includes:
a fifth transistor including a fifth base terminal, an eleventh transistor terminal, and a twelfth transistor terminal;
wherein:
the fifth base terminal is coupled to the fifth transistor terminal; and
the fifth transistor is configured to receive a portion of the third input current as a fifth base current.

12. The system of claim 11 wherein the first channel driver further includes:
a sixth transistor including a sixth base terminal, a thirteenth transistor terminal and a fourteenth transistor terminal; and
a second current mirror circuit;
wherein:
the second current mirror circuit is coupled to the fifth transistor at the fifth base terminal;
the second current mirror circuit is coupled to the sixth transistor at the sixth base terminal; and
the second current mirror circuit is configured to mirror the fifth base current to generate a sixth base current for the sixth transistor, the fifth base current being equal in magnitude to the sixth base current.

13. The system of claim 12 wherein:
the first channel driver further includes a seventh transistor including a fifteenth transistor terminal, a sixteenth transistor terminal, and a seventeenth transistor terminal; and
the seventh transistor is configured to receive a voltage signal at the fifteenth transistor terminal from the fifth transistor and output the first channel current to one or more light emitting diodes, the first channel current flowing from the one or more light emitting diodes into the seventh transistor.

14. The system of claim 13 wherein the seventh transistor is a laterally diffused metal oxide semiconductor (LDMOS) transistor.

15. The system of claim 1 wherein the first channel current divider includes:
a first current mirror circuit including a first circuit branch, a second circuit branch, and a third circuit branch, the first circuit branch, the second circuit branch, and the third circuit branch being mutually coupled;

a second current mirror circuit including a fourth circuit branch and a fifth circuit branch, the fourth circuit branch and the fifth circuit branch being mutually coupled; and a third current mirror circuit including a sixth circuit branch, a seventh circuit branch, and an eighth circuit branch, the sixth circuit branch, the seventh circuit branch, and the eighth circuit branch being mutually coupled;

wherein:
the first current mirror circuit is configured to receive a second reference current at the first circuit branch, and to generate a first mirror current in the second circuit branch, the first mirror current being proportional to the second reference current in magnitude;
the second current mirror circuit is configured to receive the first channel driving current in the fourth circuit branch and to generate a second mirror current, the second mirror current being proportional to the first channel driving current in magnitude; and
the second current mirror circuit is further configured to divert at least a portion of the second mirror current to generate the first input current, the sum of the first input current and the first mirror current being equal in magnitude to the second mirror current;

wherein:
the first current mirror circuit is further configured to generate a third mirror current in the third circuit branch, the third mirror current being proportional to the second reference current in magnitude;
the third current mirror circuit is configured to receive the third mirror current in the sixth circuit branch, and to generate the third input current in the seventh circuit branch, the third input current being proportional to the third mirror current in magnitude; and
the third current mirror circuit is further configured to generate the second input current in the eighth circuit branch, the second input current being proportional to the third mirror current in magnitude.

16. The system of claim 15 wherein the first circuit branch, the second circuit branch, the third circuit branch, the fourth circuit branch, the fifth circuit branch, the sixth circuit branch, the seventh circuit branch and the eighth circuit branch each include one or more transistors coupled in series.

17. The system of claim 1 wherein the first channel current and the second channel current are matched in magnitude.

18. A system for generating a plurality of channel currents, the system comprising:
a channel reference generator configured to receive a first reference current and generate at least a first channel driving current and a second channel driving current;
a first channel current divider configured to receive the first channel driving current and generate a first input current, a second input current, and a third input current;
a second channel current divider configured to receive the second channel driving current and generate a fourth input current, a fifth input current, and a sixth input current;
a first channel driver configured to receive the first input current, the second input current, and the third input current and generate a first channel current; and
a second channel driver configured to receive the fourth input current, the fifth input current, and the sixth input current and generate a second channel current;

wherein the first channel driver includes:
a first transistor including a first transistor terminal, a second transistor terminal, and a third transistor terminal;
a second transistor including a fourth transistor terminal, a fifth transistor terminal, and a sixth transistor terminal;
a first resistor associated with a first resistance and coupled to the third transistor terminal at a first voltage; and
a second resistor associated with a second resistance and coupled to the sixth transistor terminal at a second voltage;

wherein:
the first transistor terminal and the fourth transistor terminal are coupled;
the second transistor terminal is configured to receive the second input current; and
the fifth transistor terminal is configured to receive the third input current;

wherein:
a multiplication of the first resistance and a sum of the second input current and the first channel current is equal to a first magnitude;
a multiplication of the second resistance and a sum of the first input current and the third input current is equal to a second magnitude;
the first magnitude is equal to the second magnitude minus an offset voltage; and
the offset voltage is equal to a difference between the second voltage and the first voltage in magnitude.

19. The system of claim 18 wherein:
the first channel driver is further configured to output the first channel current to one or more first light emitting diodes corresponding to a first channel; and
the second channel driver is further configured to output the second channel current to one or more second light emitting diodes corresponding to a second channel.

20. The system of claim 19 wherein:
the first channel current flows from the one or more first light emitting diodes into the first channel driver; and
the second channel current flows from the one or more second light emitting diodes into the second channel driver.

21. The system of claim 18 wherein:
the first transistor is a first bipolar junction transistor;
the second transistor is a second bipolar junction transistor;
the first transistor terminal is a first base terminal; and
the fourth transistor terminal is a second base terminal.

22. The system of claim 21 wherein the first channel driver further includes:
a third transistor including a third base terminal, a seventh transistor terminal, and an eighth transistor terminal;
wherein:
the third base terminal and the second transistor terminal are coupled;
the eighth transistor terminal, the first base terminal, and the second base terminal are coupled;
the first transistor is configured to receive a first base current from the third transistor at the eighth transistor terminal;
the second transistor is configured to receive a second base current from the third transistor at the eighth transistor terminal; and
the third transistor is configured to receive at least a portion of the second input current as a third base current.

23. The system of claim 22 wherein the first channel driver further includes:
- a fourth transistor including a fourth base terminal, a ninth transistor terminal, and a tenth transistor terminal; and
- a first current mirror circuit;

wherein:
- the first current mirror circuit is coupled to the third transistor at the seventh transistor terminal;
- the first current mirror circuit is coupled to the fourth transistor at the ninth transistor terminal;
- the fourth transistor is configured to receive at least a portion of the third input current as a fourth base current; and
- the first current mirror circuit is configured to mirror a first current flowing through the third transistor to generate a second current flowing through the fourth transistor, the fourth base current being equal in magnitude to the third base current.

24. A method for generating a plurality of channel currents, the method comprising:
- receiving a first reference current;
- generating at least a first channel driving current and a second channel driving current;
- processing information associated with the first channel driving current and the second channel driving current;
- generating a first input current, a second input current, and a third input current based on at least information associated with the first channel driving current;
- processing information associated with the first input current, the second input current, and the third input current;
- generating a fourth input current, a fifth input current, and a sixth input current based on at least information associated with the second channel driving current;
- processing information associated with the fourth input current, the fifth input current, and the sixth input current;
- generating a first channel current based on at least information associated with the first input current, the second input current, and the third input current; and
- generating a second channel current based on at least information associated with the fourth input current, the fifth input current, and the sixth input current;

wherein:
- a sum of the first input current and the second input current is equal to the first channel driving current;
- the second input current is equal to the third input current;
- a sum of the fourth input current and the fifth input current is equal to the second channel driving current; and
- the fifth input current is equal to the sixth input current.

25. A method for generating a plurality of channel currents, the method comprising:
- receiving a first reference current;
- generating at least a first channel driving current and a second channel driving current;
- processing information associated with the first channel driving current and the second channel driving current;
- generating a first input current, a second input current, and a third input current based on at least information associated with the first channel driving current;
- processing information associated with the first input current, the second input current, and the third input current;
- generating a fourth input current, a fifth input current, and a sixth input current based on at least information associated with the second channel driving current;
- processing information associated with the fourth input current, the fifth input current, and the sixth input current;
- generating a first channel current based on at least information associated with the first input current, the second input current, and the third input current; and
- generating a second channel current based on at least information associated with the fourth input current, the fifth input current, and the sixth input current;

wherein:
- a multiplication of a first resistance and a sum of the second input current and the first channel current is equal to a first magnitude;
- a multiplication of a second resistance and a sum of the first input current and the third input current is equal to a second magnitude; and
- the first magnitude is equal to the second magnitude minus an offset voltage.

* * * * *